Jan. 11, 1955
G. M. LEE ET AL
2,699,340
LOCKING MEANS FOR THE STAKES OF LOGGING BUNKS
Filed Dec. 1, 1953
2 Sheets-Sheet 1
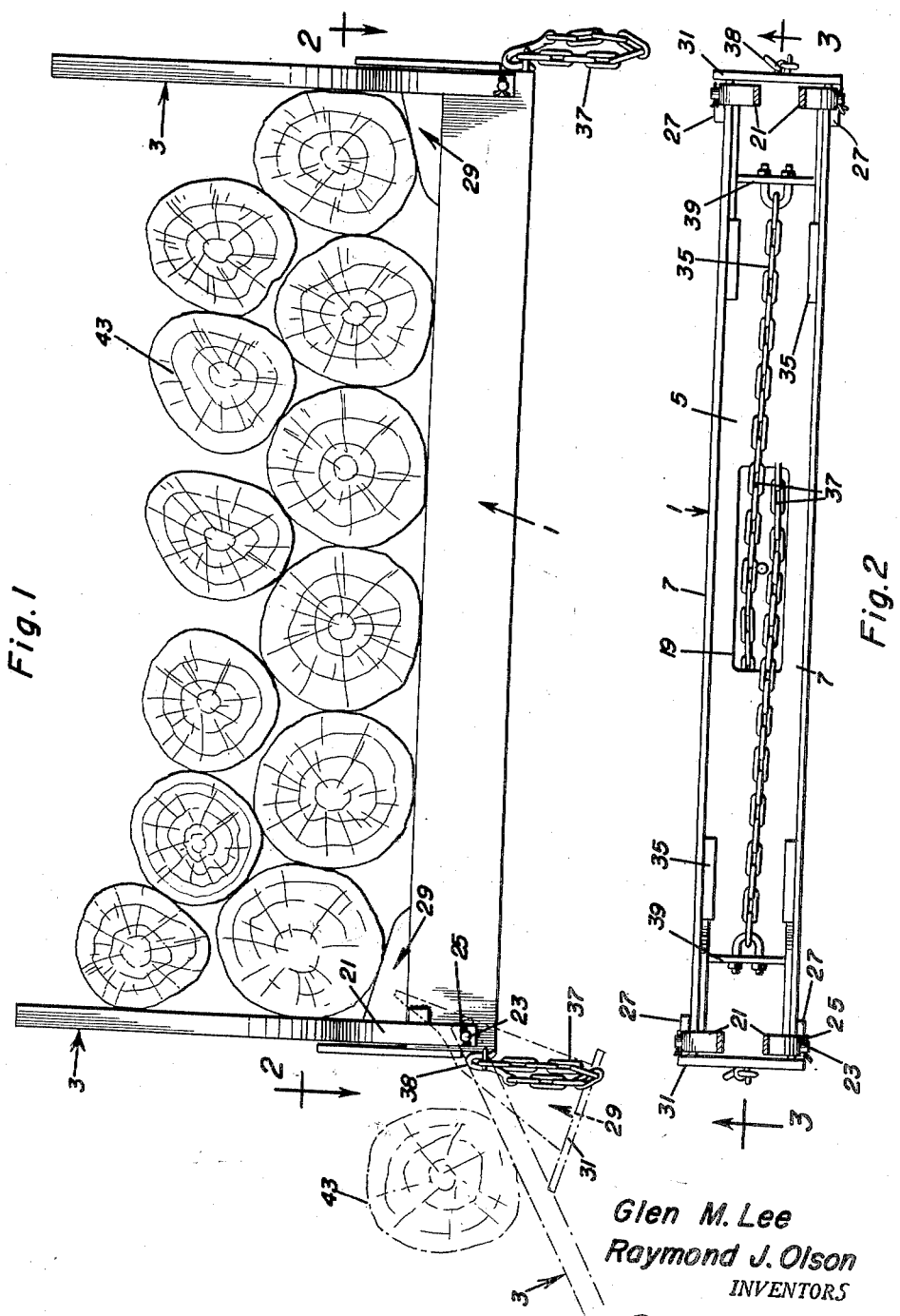
Glen M. Lee
Raymond J. Olson
INVENTORS

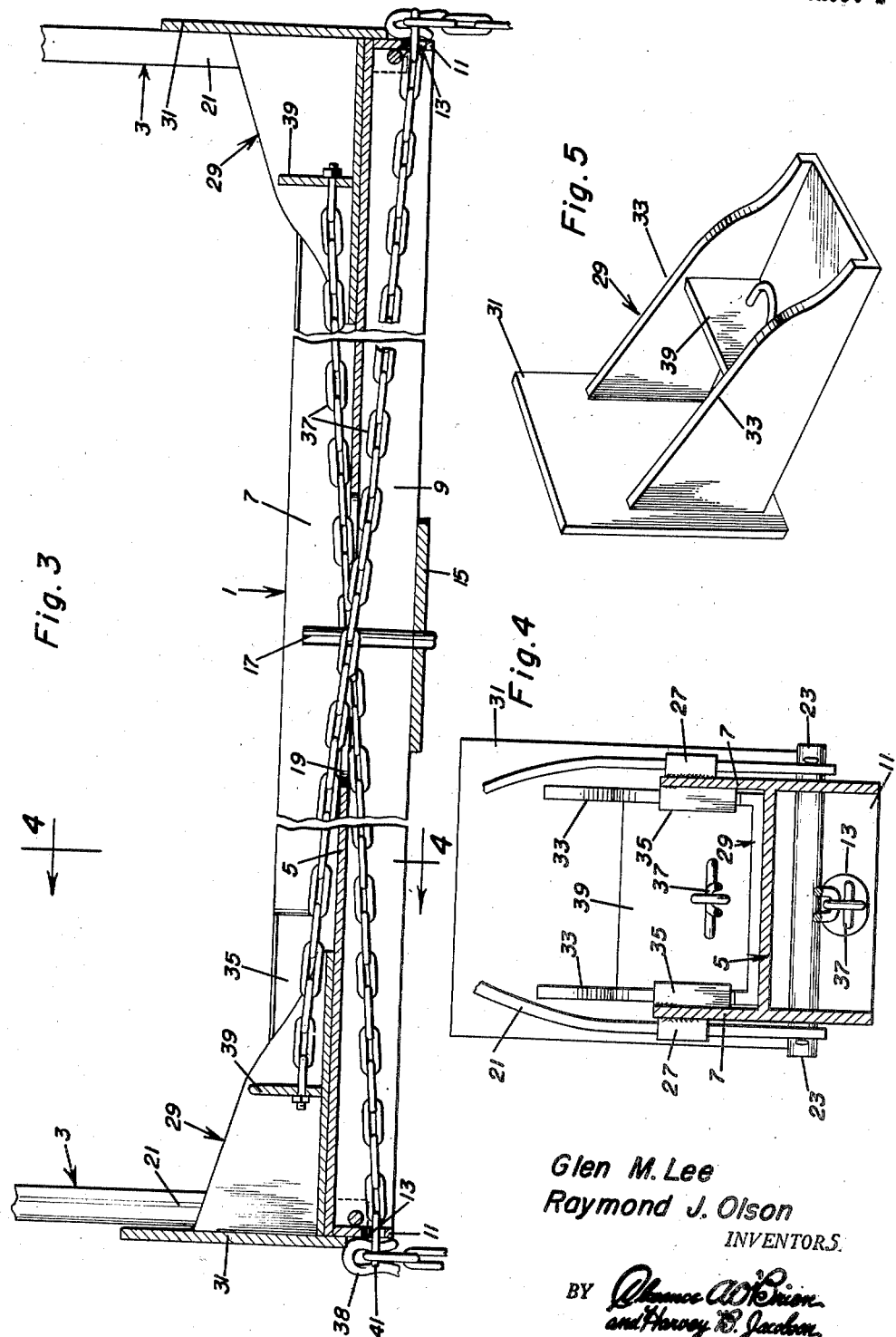

United States Patent Office 2,699,340
Patented Jan. 11, 1955

2,699,340

LOCKING MEANS FOR THE STAKES OF LOGGING BUNKS

Glen M. Lee and Raymond J. Olson, John Day, Oreg.

Application December 1, 1953, Serial No. 395,499

3 Claims. (Cl. 280—145)

Our invention relates to improvements in locks for the end stakes of logging bunks such as are used on logging trailers and the like.

As is well known such bunks are mounted transversely on logging trailers and carry at the ends of the bunks a pair of stakes for holding the logs therebetween and which are pivoted to the ends of the bunks for swinging outwardly and downwardly to release the logs for unloading purposes.

The primary object of our invention is to provide in a logging bunk of the channeled bolster type with pivoted end stakes, a stake locking member slidable into and out of the ends of the bunk into stake locking and unlocking position, and means for locking and releasing the members at each end of the bunk from the opposite end of the bunk for safety purposes.

Other and subordinate objects together with the precise nature of our improvements will be readily understood when the succeeding description and claims are read with reference to the drawings accompanying and forming part of this specification.

In said drawings:

Figure 1 is a view in side elevation of a logging bunk equipped with our improved locking means for the stakes of the logging bunk, the locking means being shown in full lines in locking position and in dotted lines in unlocking position at one end of the bunk, and the logs being shown in end elevation;

Figure 2 is a view in horizontal section taken on the line 2—2 of Figure 1;

Figure 3 is an enlarged view in vertical longitudinal section taken on the line 3—3 of Figure 2 and partly broken away;

Figure 4 is a further enlarged view in vertical transverse section taken on the line 4—4 of Figure 3, and Figure 5 is an enlarged view in perspective of one of the slide members.

Referring by numerals to the preferred embodiment of our invention illustrated in the drawings, 1 designates the bunk and 3 the type of stakes for which our improved locking means is especially designed.

The bunk 1 is, with the exceptions presently noted, of the conventional bolster beam form of H shape in cross-section with a central longitudinal web 5 dividing the same into upper and lower channels 7, 9. The lower channel 9 is closed at the ends of the bunk 1 by end plates 11 each having an aperture 13 therein for a purpose presently seen. The bunk is adapted to be supported on a logging trailer, not shown, by a central bottom plate 15 through which a kingpin 17 on the trailer extends upwardly through a central longitudinal slot 19 in the web.

The stakes 3 are formed with forked lower ends 21 straddling the bunk 1 at opposite ends thereof and pivoted by transverse shafts 23 to said bunk for swinging outwardly of the ends of the bunk from vertical log holding position shown in full lines in the drawings into downwardly inclined log releasing position shown in dotted lines in Figure 1. Cotter pins 25 in the shafts 23 hold said shafts in place. Stop lugs 27 on the sides of the bunk 1 establish the log holding positions of said stakes 3.

The locking means for the stakes 3 comprises a pair of locking slide members 29 fitting in the upper channel 7 at opposite ends of the bunk 1 and slidable into and out of said ends into stake locking and releasing positions respectively. The slide members 29 are elongated castings of channel form and straddled by the forked ends 21 when in locking position.

Rectangular keeper plates 31 on outer ends of the slide members 29 engage the ends of the bunk 1 and establish the locking positions of said slide members, said plates 31 overlapping the forked ends 21 of the stakes 3 to block swinging of said stakes 3 into log releasing position.

The slide members 29 are provided with wedge shaped sides 33 fitting, in the locking position of said slides, under internal wedge shaped ribs 35 in the upper channel 7. The sides 33 and the ribs 35 form hold down means for said members 29 preventing upward displacement of said members 29 when the bunk is unloaded, and said sides 33 incline toward the outer ends of said members 29 above the bunk 1 so that bottom logs at the ends of the bunk 1 will rest on said sides and hold the slide members 29 down when the bunk 1 is loaded at its ends.

The slide members 29 are releasably locked in stake locking position by means of a pair of chains 37 attached at one end to cross webs 39 in said members and which extend from said members oppositely in crossed relation through the slot 19 to the ends of the bunk 1 opposite their attached slide member. At the ends of the bunk 1 the chains 37 are extended out of the apertures 13 in the end plates 11 and fastened by hooks 38 hooked through links 41 of the chains at the outer sides of said end plates 11.

As will now be seen with the slide members 29 slid into locking position and locked in that position by the described means the bunk 1 may be loaded with logs 43 between said stakes 3 as shown in Figure 1 and said stakes will hold against the heavy pressure of the logs against the same. Either stake 3 may be unlocked by unlocking its locking slide member 29 from the opposite end of the bunk 1, so that the unlocked stake may swing into log releasing position. The slide member 29, as will be clear, may be unlocked by merely unhooking the hook 38 at said opposite end of the bunk 1, so that said slide member may be slid out of the bunk 1 by swinging of the stake 3 into log releasing position.

The foregoing will it is believed suffice to impart a clear understanding of our invention.

Manifestly the invention is susceptible of modification without departing from the inventive concept and right is herein reserved to such modifications as fall within the scope of the invention as herein set forth.

What is claimed as new is as follows:

1. In a logging bunk, a bolster beam for supporting logs comprising a longitudinal centrally slotted web and a longitudinal central channel extending from end to end of said beam, a pair of log holding stakes having forked lower ends straddling the ends of the beam and pivoted thereto for swinging outwardly of the ends of the beam from vertical log holding position into downwardly inclined log releasing position, a pair of locking members at opposite ends of said beam slidable into and out of said channel into stake locking and releasing positions, respectively and provided with end keeper plates overlapping said forked ends and blocking swinging of said stakes into releasing position in the locking position of said members, and a pair of flexible members attached at corresponding ends to said locking members and extending oppositely in crossed relation along said channel and through said slot to the ends of the beam opposite the members to which said flexible members are attached, said flexible members being releasably secured at their other ends to said beam to releasably lock said members in locking position, said channel having pairs of ribs in opposite sides thereof, and said locking members fitting in the locking position thereof under said pairs of ribs to hold the locking members down in said channel.

2. In a logging bunk, a bolster beam for supporting logs comprising a longitudinal centrally slotted web and a longitudinal central channel extending from end to end of said beam, a pair of log holding stakes having forked lower ends straddling the ends of the beam and pivoted thereto for swinging outwardly of the ends of the beam from vertical log holding position into downwardly inclined log releasing position, a pair of locking members at opposite ends of said beam slidable into and out of said channel into stake locking and releasing positions, respectively and provided with end keeper plates overlapping said forked ends and blocking swinging of said stakes into releasing position in the locking position of said members, and a pair of flexible members attached at corresponding ends to said locking members and extending oppositely in crossed relation along said channel and through said slot to the ends of the beam opposite the members to which said flexible members are attached, said flexible members being releasably secured at their other ends to said beam to releasably lock said members in locking position, said locking members having sides inclining above said channel to support bottom logs at the ends of the beam for holding said locking members down in said channel.

3. In a logging bunk, a bolster beam for supporting logs comprising a longitudinal centrally slotted web and a longitudinal central channel extending from end to end of said beam, a pair of log holding stakes having forked lower ends straddling the ends of the beam and pivoted thereto for swinging outwardly of the ends of the beam from vertical log holding position into downwardly inclined log releasing position, a pair of locking members at opposite ends of said beam slidable into and out of said channel into stake locking and releasing positions, respectively and provided with end keeper plates overlapping said forked ends and blocking swinging of said stakes into releasing position in the locking position of said members, and a pair of flexible members attached at corresponding ends to said locking members and extending oppositely in crossed relation along said channel and through said slot to the ends of the beam opposite the members to which said flexible members are attached, said flexible members being releasably secured at their other ends to said beam to releasably lock said members in locking position, and side stop lugs on said beam engaged by said forked ends to establish the log holding position of said stakes.

References Cited in the file of this patent

FOREIGN PATENTS 119,265     Sweden _____ July 15, 1947